United States Patent [19]

Taguchi et al.

[11] Patent Number: 5,330,844
[45] Date of Patent: Jul. 19, 1994

[54] ADHESIVE COMPOSITOIN AND METAL-BONDED COMPOSITE

[75] Inventors: Koichi Taguchi; Kinpei Iwata, both of Shibukawa, Japan

[73] Assignee: Denki Kagaku Kogyo Kabushiki Kaisha, Tokyo, Japan

[21] Appl. No.: 813,694

[22] Filed: Dec. 27, 1991

[30] Foreign Application Priority Data

Dec. 28, 1990 [JP] Japan ................................ 2-415502
May 23, 1991 [JP] Japan ................................ 3-146544

[51] Int. Cl.$^5$ .................... B32B 15/08; C08K 3/34; C09J 133/08; C09J 133/10
[52] U.S. Cl. .................... 428/463; 428/330; 428/331; 428/461; 523/116; 523/202; 523/203; 523/216; 524/433; 524/450; 524/779; 524/789; 524/906
[58] Field of Search ............... 524/433, 450, 779, 789, 524/906; 428/330, 331, 461, 463; 523/116, 202, 203, 216

[56] References Cited

U.S. PATENT DOCUMENTS 3,660,526  5/1972  Wegemund et al. ......... 524/789 X
4,412,015  10/1983  Lustgarten et al. ............ 523/116
4,554,301  11/1985  Dohi et al. .................... 524/210

FOREIGN PATENT DOCUMENTS 0330115  8/1989  European Pat. Off. .
49-097050  9/1974  Japan .

OTHER PUBLICATIONS

Chemical Abstracts, vol. 114, No. 26, Jul. 1, 1991, 248913M, p. 82, & JP-A-03-006278, Jan. 11, 1991.
Patent Abstracts of Japan, vol. 2, No. 81, Jun. 28, 1978, & JP-A-53-037742, Apr. 7, 1978, I. Ijichi, et al., "Moldings for Coating".

Primary Examiner—D. S. Makarani
Attorney, Agent, or Firm—Oblon, Spivak, McClelland, Maier & Neustadt

[57] ABSTRACT

An adhesive composition comprising an acrylate monomer and/or a methacrylate monomer, an organic peroxide and a reducing agent, which contains zeolite or calcium oxide.

12 Claims, No Drawings

ADHESIVE COMPOSITOIN AND METAL-BONDED COMPOSITE

The present invention relates to an acrylic adhesive composition having excellent heat deterioration resistance and a metal-bonded composite having constituting materials bonded by such an adhesive composition.

BACKGROUND OF THE INVENTION

As reactive acrylic adhesives, anaerobic adhesives, second generation acrylic adhesives (SGA) and thermosetting adhesives have recently been known.

An anaerobic adhesive will be cured when the adhesive composition is pressed between the materials to be bonded, so that air is shut off. Accordingly, a portion of the adhesive squeezed out when pressed and being in contact with air, will not be cured. Such an adhesive is widely used since it is of one-pack type and thus excellent in the operation efficiency.

A second generation acrylic adhesive is of a two-pack type, but it is not required to accurately measure the two liquids, and it can be cured in from a few minutes to a few tens minutes at room temperature by very rough measurements, followed by mixing, or by mere contact of the two liquids. Thus, it has excellent operation efficiency. Besides, it has high peel strength and impact strength, and curing of a squeezed out portion is also excellent. Therefore, this adhesive is widely employed.

A thermosetting adhesive comprises an acrylate monomer and/or a methacrylate monomer, and an organic peroxide, as the main components, and is a one-pack type adhesive which will be cured by thermal decomposition of a peroxide.

However, a product having a steel sheet or a galvanized steel sheet bonded thereto is frequently subjected to baking finish to obtain a final product, and when conventional acrylic adhesives are subjected to such a high temperature as baking finish (e.g. at a level of from 160° to 180° C.), the bonded portion is likely to deteriorate, whereby the bond strength tends to substantially decrease.

Various proposals have been made for preventing heat deterioration of acrylic adhesives. For example, Japanese Unexamined Patent Publications No. 173174/1983 and No. 174476/1983 propose to use highly heat resistant polysiloxane or ethylene-acrylate rubber as an elastomer component to prevent the heat deterioration. On the other hand, Japanese Unexamined Patent Publication No. 129372/1987 proposes to incorporate an epoxy acrylate to an acrylate component and/or a methacrylate component to prevent the heat deterioration. Further, Japanese Unexamined Patent Publication No. 147477/1983 discloses that the heat deterioration can be prevented by using a butadiene elastomer and a phosphorus-containing compound in combination in the absence of a free organic acid.

However, the above methods are all directed to preventing the heat deterioration of the adhesive resins themselves, and there has been no instance in which prevention of heat deterioration is attempted in connection with the materials to be bonded. In many cases, a steel sheet or a galvanized steel sheet has chemical conversion treatment applied to improve corrosion resistance as a prime coat for baking finish. In such chemical conversion treatment, a metal to be treated is chemically reacted with a corrosive solution (a chemical conversion bath) prepared under a specific condition, whereby a strongly adherent insoluble corrosion product will be formed on the metal surface, which serves as a corrosion resistant layer, as a prime coat for painting or as a lubricating coat for plastic processing. A phosphate treatment, a chromate treatment or an oxalate treatment may be mentioned as such a surface conversion treatment.

When a metal having such treatment applied is used as a material to be bonded, it has been impossible by conventional techniques to prevent the deterioration of the bond strength due to heat deterioration of the adhesive.

In a case of a urethane type coating material or adhesive, it sometimes happens that free isocyanate groups react with moisture to form carbon dioxide gas, and the gas bubbles cause a deterioration of the surface condition or a deterioration of the bond strength. To prevent such gas bubbles, it has been proposed to incorporate a certain specific zeolite (Japanese Examined Patent Publication No. 37331/1973). However, in an acrylic adhesive as in the present invention, free isocyanate groups as present in a urethane-type adhesive do not exist, and no gas bubbles will form. Accordingly, it has not been known to incorporate zeolite to an acrylic adhesive.

It is an object of the present invention to solve the above-mentioned problems.

SUMMARY OF THE INVENTION

The present invention provides an adhesive composition comprising an acrylate monomer and/or a methacrylate monomer, an organic peroxide and a reducing agent, which contains zeolite or calcium oxide.

The present invention also provides a metal-bonded composite comprising a metal material and the same or different metal material or other material bonded by such an adhesive composition.

Now, the present invention will be described in detail with reference to the preferred embodiments.

DESCRIPTION OF THE PREFERRED EMBODIMENTS

There is no particular restriction as to the acrylate monomer or the methacrylate monomer (hereinafter referred to simply as the (meth)acrylate) to be used in the present invention, so long as it is radical-polymerizable. Namely, mono(meth)acrylates and poly(meth)acrylates may be employed. Specific examples will be given below.

(1) Monomers of the formula $Z-O-R_1$

In the formula, Z is a (meth)acryloyl group, a $CH_2=CHCOOCH_2-CH(OH)CH_2-$ group or a $CH_2=C(CH_3)COOCH_2CH(OH)_2-$ group, ana $R_1$ is a $C_{1-20}$ alkyl group, a cycloalkyl group, a benzyl group, a phenyl group, a tetrahydrofurfuryl group, a glycidyl group, a dicyclopentanyl group, a dicyclopentenyl group or a (meth)acryloyl group. Further, such compounds having substituents may also be used.

Such monomers include, for example, methyl (meth)acrylate, ethyl (meth)acrylate, (iso)propyl (meth)acrylate, butyl (meth)acrylate, 2-ethylhexyl (meth)acrylate, cyclohexyl (meth)acrylate, benzyl (meth)acrylate, tetrahydrofurfuryl (meth)acrylate, dicyclopentanyl (meth)acrylate and dicyclopentenyl (meth)acrylate.

(2) Monomers of the formula $Z-O-(R_2O)_p-R_1$

In the formula, Z and $R_1$ are the same as described in (1) except that $R_1$ includes H. $R_2$ is $-CH_2H_4-$, $-C_3H_6-$, —C₄H₈— or —C₆H₁₂—, and p is an integer of from 1 to 25.

Such monomers include, for example, 2-hydroxyethyl (meth)acrylate, 2-hydroxypropyl (meth)acrylate, ethoxyethyl (meth)acrylate, polyethylene glycol (meth)acrylate, methoxypolyethylene glycol (meth)acrylate, phenoxyethyl (meth)acrylate, dicyclopentenyloxyethyl (meth)acrylate, phenoxydiethylene glycol (meth)acrylate, tripropylene glycol di(meth)acrylate and 1,6-hexanediol di(meth)acrylate.

(3) Monomers of the formula:

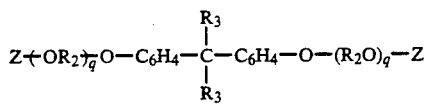

In the formula, Z and $R_2$ are as defined above, and $R_3$ is H or a $C_{1-4}$ alkyl group, and q is an integer of from 0 to 8.

Such monomers include, for example, 2,2-bis(4-methacryloxyphenyl)propane, 2,2-bis(4-methacryloxyethoxyphenyl)propane, 2,2-bis(4-methacryloxydiethoxyphenyl)propane, 2,2-bis(4-methacryloxypropoxyphenyl)propane and 2,2-bis(4-methacryloxytetraethoxyphenyl)propane.

(4) (Meth)acrylic acid esters of polyhydric alcohols, which are not included in the monomers described in the above (1), (2) and (3)

Such monomers include, for example, trimethylol propane tri(meth)acrylate, neopentyl glycol di(meth)acrylate, pentaerythritol tetra(meth)acrylate, dipentaerythritol (meth)acrylate, glycerol (meth)acrylate and glycerol di(meth)acrylate.

(5) Urethane prepolymers having (meth)acryloyloxy groups

Such prepolymers can be obtained, for example, by reacting a (meth)acrylic acid ester having a hydroxyl group with an organic polyisocyanate and a polyhydric alcohol. Here, specific examples of the (meth)acrylic acid ester having a hydroxyl group include hydroxyethyl (meth)acrylate, hydroxypropyl (meth)acrylate and hydroxybutyl (meth)acrylate. Specific examples of the organic polyisocyanate include toluene diisocyanate, 4,4-diphenylmethane diisocyanate, hexamethylene diisocyanate and isophorone diisocyanate. Specific examples of the polyhydric alcohol include polyethylene glycol, polypropylene glycol, polytetramethylene glycol and polyester polyol.

(6) Acidic phosphoric compounds of the formula:

$$(R-O)_n-\overset{O}{\underset{\|}{P}}-(OH)_{3-n}$$

wherein R is a $CH_2=CR_4CO(OR_5)_m-$ group (wherein $R_4$ is H or $CH_3$, $R_5$ is $-C_2H_4-$, $-C_3H_6-$,

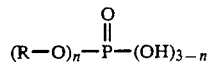

—C₄H₈—, —C₆H₁₂— or

and m is an integer of from 1 to 10), and n is 1 or 2.

The acidic phosphoric compounds of the formula (I) include, for example, acid phosphoxyethyl (meth)acrylate, acid phosphoxypropyl (meth)acrylate and bis(2-(meth)acryloyloxyethyl)phosphate.

The monomers mentioned above in (1), (2), (3), (4), (5) and (6) may be used alone or in combination as a mixture of two or more of them.

As the zeolite to be used in the present invention, a zeolite having a water content of at most 3% by weight is preferred. As such a zeolite, a commercially available usual synthetic zeolite may be subjected to heat treatment at a temperature of at least about 300° C., whereby a zeolite having a water content of at most 3% by weight can readily be obtained. As the zeolite, a natural product or a synthetic product may be used so long as it is a crystalline alumino silicate of elements in Groups 1A and 2A of the Periodic Table represented by the formula $M_{2/k}O \cdot Al_2O_3 \cdot xSiO_2 \cdot yH_2O$ (M: metal cation, k: valency). A zeolite having a particle size of at most 100 μm is preferred. Commercial products include "3A", "4A", "5A", "13X" and "10X". Among them, "3A" type is preferred.

The zeolite is incorporated in an amount of from 3 to 40 parts by weight, preferably from 4 to 30 parts by weight, more preferably from 5 to 25 parts by weight, per 100 parts by weight of the (meth)acrylate monomer. If the amount is less than 3 parts by weight, the effect for heat deterioration resistance tends to be small. On the other hand, if the amount exceeds 40 parts by weight, the viscosity of the adhesive composition tends to be too high to be practical.

The calcium oxide to be used in the present invention may be any material so long as it contains calcium oxide. It may be a commercially available calcium oxide, or may be calcium oxide containing calcium hydroxide or calcium carbonate. The calcium oxide may have any optional shape, but a powder, particularly a fine powder having a particle size of at most 100 μm, is preferred.

The calcium oxide is incorporated preferably in an amount of from 5 to 40 parts by weight per 100 parts by weight of the (meth)acrylate monomer. If the amount is less than 5 parts by weight, the effect for heat deterioration resistance tends to be low. On the other hand, if the amount exceeds 40 parts by weight, the viscosity of the adhesive composition tends to be too high to be practical.

There is no particular restriction as to the method of incorporating the zeolite or the calcium oxide. If separation or sedimentation is feared during the storage of the adhesive, a dispersion stabilizer may be employed, or the zeolite or calcium oxide may be incorporated immediately prior to the use of the adhesive. When moisture absorption is feared, the zeolite or calcium oxide may be mixed with other components at the time of using the adhesive. In the case of a two-pack type adhesive, the zeolite or the calcium oxide may be added to either one or both of the first and second liquids.

The organic peroxide may be any optional organic peroxide. It may be, for example, cumene hydroperoxide, paramenthane hydroperoxide, tert-butyl hydroperoxide, diisopropyl benzene dihydroperoxide, methyl ethyl ketone peroxide, benzoyl peroxide or tert-butyl peroxybenzoate. However, the organic peroxide is not limited to such specific examples, The organic peroxide is incorporated preferably in an amount of from 0.1 to 20 parts by weight per 100 parts by weight of the (meth-)acrylate monomer. If the amount is less than 0.1 part by weight, the curing speed will be slow, and if it exceeds 20 parts by weight, the storage stability tends to be poor.

As the reducing agent, any optional reducing agent may be employed so long as it is a reducing agent capable of reacting with the above organic peroxide to generate radicals. Typical reducing agents include tertiary amines, thiourea derivatives and metal salts. The tertiary amines include triethylamine, tripropylamine and N,N-dimethyl-p-toluidine. The thiourea derivatives include 2-mercaptobenzimidazole, methylthiourea, dibutylthiourea, tetramethylthiourea and ethylene thiourea. The metal salts include cobalt naphthenate, copper naphthenate and vanadylacetyl acetone.

The reducing agent is incorporated preferably in an amount of from 0.05 to 15 parts by weight, more preferably from 0.1 to 10 parts by weight, per 100 parts by weight of the (meth)acrylate monomer.

To the adhesive composition of the present invention, (meth)acrylic acid may be incorporated to increase the curing speed of the adhesive or to improve the adhesion to the material to be bonded. Further, in order to improve the peel strength or impact strength, an elastomer component may be incorporated to the adhesive composition of the present invention. As such an elastomer component, various synthetic rubbers may be mentioned, such as nitrile-butadiene rubber and chlorosulfonated polyethylene.

Further, for the purpose of adjusting the viscosity or the fluidity, a thermoplastic polymer such as a methyl methacrylate-butadiene-styrene copolymer (hereinafter referred to simply as MBS) or linear polyurethane, or fine silica powder, may be used.

Further, in order to facilitate the curing of the portion which is in contact with air, various waxes may be incorporated.

Furthermore, for the purpose of improving the storage stability, additives such as various polymerization inhibitors or antioxidants, may be incorporated. Depending upon the purpose, a plasticizer, a filler, a colorant, etc. may be added.

The present invention may be used for a one-pack type adhesive or for a two-pack type adhesive. When it is used as a one-pack type adhesive, the organic peroxide and the reducing agent are substantially separated by such a technique as microencapsulation or by chemical modification from which the organic peroxide and the reducing agent can readily be restored. Otherwise, they may be selected from compounds which show a very low reaction rate at a normal temperature even when they are contacted to each other.

There is no particular restriction as to the materials to be bonded by the adhesive composition of the present invention. However, the adhesive composition of the present invention exhibits particularly excellent effects when applied to a metal surface, especially to a metal surface treated by chemical conversion treatment or to a metal-plated surface.

The metal-bonded composite of the present invention is obtained by bonding one or more kinds of metal materials, or such metal materials and one or more kinds of materials other than metal.

The above metal materials include, for example, metals, metal-plated materials, and such materials having their surface treated by chemical conversion treatment. The above-mentioned materials other than metal include, for example, shaped products of plastic, glass, ceramic or cement, glass fibers and woven fabrics, carbon or graphite fibers and woven fabrics, bricks, wood materials and laminated plates. Such metal materials and materials other than metal are not particularly limited with respect to their shapes or structures.

The metal-bonded composite of the present invention is useful, for example, for the purpose of reducing the weight of a metal-bonded composite having a baking finish surface.

For reducing the weight of a metal-bonded composite, it is possible to employ a method wherein the thickness of the materials is reduced to be thin so that the weight of the final composite will be reduced. However, such a method can not be used, for example, in a case of a composite comprising one or two metal sheets (a) and a reinforcing material (b) supporting the metal sheets from the rear side or from the inside (such as a corrugated or hat-shaped metal composite) which used to be prepared by welding the materials (a) and (b), because if the material (a) is a thin metal sheet, welding spots are likely to remain on the surface of the composite, or a thermal strain will be formed. A conventional acrylic adhesive can not be used, since the deterioration in the bond strength due to baking finish will be substantial.

By using the adhesive composition of the present invention excellent in the heat deterioration resistance for bonding the above materials (a) and (b), it is possible to obtain a metal-bonded composite having the weight and thickness reduced and capable of being subjected to baking finish.

Now, the present invention will be described in further detail with reference to Examples and Comparative Examples. However, it should be understood that the present invention is by no means restricted to such specific Examples.

EXAMPLES 1 to 5 and COMPARATIVE EXAMPLE 1

Two-pack type adhesive compositions comprising the first and second liquids were prepared by mixing various components in the proportions as identified in Table 1.

Galvanized steel sheets having their surface treated by phosphate treatment (SECC-P) of 200×25×1.2 mm and 200×25×0.4 mm were used as test specimens. The first and second liquids of the respective adhesive compositions prepared above, were mixed, and the mixture was immediately applied to bond the test specimens having different thicknesses. The bonded specimens were aged at room temperature (23° C.) for 24 hours to obtain a bonded composite. For this bonding operation, a small amount of glass beads having a diameter of 100 μm were added to make the thickness of the bonding layer uniform.

The peel strength (unit: kg/25 mm) was measured in accordance with ISO 4578/1979 (tensile speed: 100 mm/min) with respect to the bonded composites themselves (without heat treatment) and the bonded composites which were left to stand at high temperatures (160°, 180° and 200° C.) and then left to cool to 23° C. The results are shown in Table 1.

TABLE 1

|  | Ex. 1 | Ex. 2 | Ex. 3 | Ex. 4 | Ex. 5 | Comp. Ex. 1 |
| --- | --- | --- | --- | --- | --- | --- |
| First liquid |  |  |  |  |  |  |
| N-220SH | 15 | 15 | 15 | 15 | 15 | 15 |
| MMA | 51 | 51 | 51 | 51 | 51 | 51 |
| 2HEMA | 17 | 17 | 17 | 17 | 17 | 17 |
| 2EHMA | 17 | 17 | 17 | 17 | 17 | 17 |
| P-56 | 0.5 | 0.5 | 0.5 | 0.5 | 0.5 | 0.5 |
| MS-3A | 5 | 10 | 15 | 20 | 20 | 0 |
| CHP | 5 | 5 | 5 | 5 | 5 | 5 |
| MEHQ | 0.2 | 0.2 | 0.2 | 0.2 | 0.2 | 0.2 |
| Second liquid |  |  |  |  |  |  |
| N-220SH | 15 | 15 | 15 | 15 | 15 | 15 |
| MMA | 51 | 51 | 51 | 51 | 51 | 51 |
| 2HEMA | 17 | 17 | 17 | 17 | 17 | 17 |
| 2EHMA | 17 | 17 | 17 | 17 | 17 | 17 |
| P-56 | 0.5 | 0.5 | 0.5 | 0.5 | 0.5 | 0.5 |
| MS-3A | 5 | 10 | 15 | 20 | 0 | 0 |
| ETU | 1.5 | 1.5 | 1.5 | 1.5 | 1.5 | 1.5 |
| APEM | 2 | 2 | 2 | 2 | 2 | 2 |
| Peel strength (kg/25 mm) |  |  |  |  |  |  |
| 23° C. | 22.1 | 21.8 | 21.3 | 19.6 | 21.7 | 19.9 |
| 160° C. | 20.8 | 20.7 | 23.0 | 20.5 | 20.6 | 9.4 |
| 180° C. | 11.4 | 11.2 | 23.8 | 21.4 | 11.3 | 9.4 |
| 200° C. | 8.0 | 11.2 | 16.8 | 18.6 | 11.4 | 8.0 |

Abbreviations:
N-220SH: acrylonitrile-butadiene rubber (manufactured by Japan Synthetic Rubber Co., Ltd.),
MMA: methyl methacrylate,
2HEMA: 2-hydroxyethyl methacrylate,
2EHMA: 2-ethylhexyl methacrylate,
P-56: paraffin (mp 56° C.),
MS-3A: molecular sieve 3A (manufactured by Union Showa K.K.),
CHP: cumene hydroperoxide,
MEHQ: hydroquinone monomethyl ether,
ETU: ethylene thiourea,
APEM: acid phosphoxyethyl methacrylate

EXAMPLES 6 to 9 and COMPARATIVE EXAMPLE 2

Two-pack type adhesive compositions comprising the first and second liquids were prepared by mixing various components in the proportions as identified in Table 2.

The peel strength was measured in the same manner as in Example 1 except that the respective compositions thus obtained were employed. The results are shown in Table 2.

TABLE 2

|  | Ex. 6 | Ex. 7 | Ex. 8 | Ex. 9 | Comp. Ex. 2 |
| --- | --- | --- | --- | --- | --- |
| First liquid |  |  |  |  |  |
| N-220SH | 10 | 10 | 10 | 10 | 10 |
| BTA III N2 | 8 | 8 | 8 | 8 | 8 |
| MMA | 50 | 50 | 50 | 50 | 50 |
| 2HEMA | 16 | 16 | 16 | 16 | 16 |
| 2EHMA | 16 | 16 | 16 | 16 | 16 |
| P-56 | 0.5 | 0.5 | 0.5 | 0.5 | 0.5 |
| CaO | 5 | 10 | 15 | 20 | 0 |
| CHP | 5 | 5 | 5 | 5 | 5 |
| MEHQ | 0.2 | 0.2 | 0.2 | 0.2 | 0.2 |
| Second liquid |  |  |  |  |  |
| N-220SH | 10 | 10 | 10 | 10 | 10 |
| BTA III N2 | 8 | 8 | 8 | 8 | 8 |
| MMA | 50 | 50 | 50 | 50 | 50 |
| 2HEMA | 16 | 16 | 16 | 16 | 16 |
| 2EHMA | 16 | 16 | 16 | 16 | 16 |
| P-56 | 0.5 | 0.5 | 0.5 | 0.5 | 0.5 |
| CaO | 5 | 10 | 15 | 20 | 0 |
| ETU | 1.5 | 1.5 | 1.5 | 1.5 | 1.5 |
| APEM/EA | 2 | 2 | 2 | 2 | 2 |
| Peel strength (kg/25 mm) |  |  |  |  |  |
| 23° C. | 21.9 | 22.3 | 24.0 | 22.1 | 20.0 |
| 160° C. | 20.9 | 22.7 | 22.8 | 22.8 | 9.1 |
| 180° C. | 19.0 | 18.4 | 20.6 | 22.6 | 8.9 |
| 200° C. | 12.1 | 12.8 | 14.6 | 17.5 | 6.1 |

Abbreviations:
BTA III N2: MBS (manufactured by Kureha Chemical Industry Co., Ltd.),
CaO: calcium oxide powder,
APEM/EA: acid phosphoxyethyl methacrylate/ethanolamine salt

EXAMPLES 10 and 11 and COMPARATIVE EXAMPLES 3 to 5

Two-pack type adhesive compositions comprising the first and second liquids were prepared by mixing various components in the proportions as identified in Table 3.

Bonded-composites were prepared in the same manner as in Example 1 except that the respective compositions thus obtained were employed. Normal state peel strength (unit: kg/25 mm) were measured in accordance with ISO 4578-1979 (tensile speed: 100 mm/min) at 23° C. under a relative humidity of 50% with respect to the bonded composites themselves (no heat treatment). Further, peel strength (unit: kg/25 mm) after heat treatment was measured in the same manner as the above normal state peel strength with respect to the bonded composites which were heat-treated at 180° C. for one hour and then left to cool 23° C. The results are shown in Table 3.

TABLE 3

|  | Ex. 10 | Ex. 11 | Comp. Ex. 3 | Comp. Ex. 4 | Comp. Ex. 5 |
| --- | --- | --- | --- | --- | --- |
| First liquid |  |  |  |  |  |
| N-220SH | 15 | 15 | 15 | 15 | 15 |
| MMA | 51 | 51 | 51 | 51 | 51 |
| 2HEMA | 34 | 34 | 34 | 34 | 34 |
| P-56 | 0.5 | 0.5 | 0.5 | 0.5 | 0.5 |
| MS-3A | 20 | 20 | 0 | 0 | 0 |
| MS-3A-W | 0 | 0 | 20 | 0 | 0 |
| Silica gel | 0 | 0 | 0 | 20 | 0 |
| CHP | 5 | 5 | 5 | 5 | 5 |
| MEHQ | 0.2 | 0.2 | 0.2 | 0.2 | 0.2 |
| Second liquid |  |  |  |  |  |
| N-220SH | 15 | 15 | 15 | 15 | 15 |
| MMA | 51 | 51 | 51 | 51 | 51 |
| 2HEMA | 34 | 34 | 34 | 34 | 34 |
| P-56 | 0.5 | 0.5 | 0.5 | 0.5 | 0.5 |
| MS-3A | 20 | 20 | 0 | 0 | 0 |
| MS-3A-W | 0 | 0 | 20 | 0 | 0 |
| Silica gel | 0 | 0 | 0 | 20 | 0 |
| ETU | 1.5 | 0 | 1.5 | 1.5 | 0 |
| VOAA | 0 | 0.6 | 0 | 0 | 0.6 |
| MA | 5 | 0 | 5 | 5 | 0 |
| APEM | 0 | 1 | 0 | 0 | 1 |
| PBQ | 0 | 0.05 | 0 | 0 | 0.05 |
| Peel strength after heat treatment (kg/25 mm) | 19.7 | 20.3 | 6.8 | 9.4 | 7.5 |
| Normal state peel strength (kg/25 mm) | 16.7 | 17.1 | 16.1 | 16.8 | 16.4 |

Abbreviations:
MS-3A-W: 16 wt % water-absorbed molecular sieve 3A,
VOAA: vanadyl acetylacetone,
MA: methacrylic acid,
PBQ: p-benzoquinone

EXAMPLE 12 and COMPARATIVE EXAMPLE 6

Two-pack type adhesive compositions comprising the first and second liquids were prepared by mixing various components in the proportions as identified in Table 4. On one side of a sheet (200×25×1.2 mm) of a galvanized steel plate having the surface treated by phosphate treatment (SECC-P), the above first liquid was applied, and on one side of another sheet of the same steel plate (200×25×0.4 mm) the above second liquid was applied, and the coated sides of the respective sheets were bonded, and the bonded sheets were aged at room temperature (23° C.) for 24 hours to obtain a bonded composite. For this bonding, a small amount of glass beads having a diameter of 100 μm were added to make the thickness of the bonding layer uniform.

Using the bonded composites, the normal state peel strength (unit: kg/25 mm) and the peel strength after heat treatment (at 180° C. for one hour) (unit: kg/25 mm) were measured in the same manner as in Example 10. The results are shown in Table 4.

TABLE 4

|  | Ex. 12 | Comp. Ex. 6 |
|---|---|---|
| First liquid |  |  |
| N-220SH | 10 | 10 |
| BTA III N2 | 7 | 7 |
| MMA | 50 | 50 |
| 2HEMA | 25 | 25 |
| IBA | 8 | 8 |
| P-56 | 0.5 | 0.5 |
| MS-3A | 15 | 0 |
| CHP | 5 | 5 |
| MEHQ | 0.2 | 0.2 |
| Second liquid |  |  |
| N-220SH | 10 | 10 |
| BTA III N2 | 7 | 7 |
| MMA | 50 | 50 |
| 2HEMA | 25 | 25 |
| IBA | 8 | 8 |
| P-56 | 0.5 | 0.5 |
| MS-3A | 15 | 0 |
| ETU | 1.5 | 1.5 |
| APEM/EA | 3 | 3 |
| Peel strength after heat treatment (kg/25 mm) | 22.7 | 9.4 |
| Normal state peel strength (kg/25 mm) | 21 | 20 |

Abbreviation:
IBA: isobornyl acrylate

The adhesive composition of the present invention has remarkably improved heat deterioration resistance and provides excellent heat resistant bond strength when used to bond metal surfaces, particularly metal surfaces treated by chemical conversion treatment or metal-plated surfaces. Accordingly, the metal-bonded composite obtainable by using the adhesive composition of the present invention, maintains sufficient bond strength even when subjected to high temperature treatment such as baking finish.

We claim:

1. An adhesive composition comprising an acrylate monomer and/or a methacrylate monomer, an organic peroxide in the amount of from 0.1 to 20 parts by weight per 100 parts by weight of the (meth)acrylate monomer, a reducing agent capable of reacting with said organic peroxide to generate radicals, and which contains zeolite in the amount of from 3 to 40 parts by weight per 100 parts by weight (meth)acrylate monomer.

2. A two-pack adhesive composition consisting of a first liquid comprising an acrylate monomer and/or a methacrylate monomer and an organic peroxide in the amount of from 0.1 to 20 parts by weight per 100 parts by weight of the (meth)acrylate monomer, and a second liquid comprising an acrylate monomer and/or a methacrylate monomer and a reducing agent capable of reacting with said organic peroxide to generate radicals, wherein either one or both of the first and second liquids contain zeolite in the amount of from 3 to 40 parts by weight per 100 parts by weight (meth)acrylate monomer.

3. The adhesive composition according to claim 1 or 2, wherein the zeolite has a water content of at most 3% by weight.

4. The adhesive composition according to claim 1 or 2, wherein the particle size of the zeolite is at most 100 μm.

5. The adhesive composition according to claim 1, wherein the zeolite is incorporated in the amount of 4 to 30 parts by weight.

6. The adhesive composition according to claim 1, wherein the zeolite is incorporated in the amount of 5 to 25 parts by weight.

7. The two-pack adhesive composition according to claim 2, wherein the zeolite is incorporated in the amount of from 4 to 30 parts by weight.

8. The two-pack adhesive composition according to claim 2, wherein the zeolite is incorporated in the amount of from 5 to 25 parts by weight.

9. A metal-bonded composite comprising a metal material and the same or different metal material or other material bonded by an adhesive composition the adhesive composition according to claim 1.

10. The metal-bonded composite according to claim 9, wherein at least one surface of the materials bonded is a metal surface treated by chemical conversion treatment.

11. The metal-bonded composite according to claim 9, wherein the zeolite is incorporated in the amount of from 4 to 30 parts by weight.

12. The metal-bonded composite according to claim 9, wherein the zeolite is incorporated in the amount of from 5 to 25 parts by weight.

* * * * *

UNITED STATES PATENT AND TRADEMARK OFFICE
CERTIFICATE OF CORRECTION

PATENT NO. : 5,330,844
DATED : July 19, 1994
INVENTOR(S) : Koichi TAGUCHI, et al.

It is certified that error appears in the above-indentified patent and that said Letters Patent is hereby corrected as shown below:

On the title page, Item [21], the Application No. should read as follows:

--813,695--

Also on the title page, Item [54] and Column 1, Line 2, in the title, "COMPOSITOIN" should read --COMPOSITION--.

Signed and Sealed this

Twenty-seventh Day of September, 1994

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,330,844
DATED : July 19, 1994
INVENTOR(S) : Koichi Taguchi et al

It is certified that error appears in the above-indentified patent and that said Letters Patent is hereby corrected as shown below:

On the title page, item [56], under Other Publication Primary Examiner's name should read as follows: —D. S. Nakarani—

COLUMN 3, line 63, "$-C_2Pt_4-$", should read -- $-C_2H_4-$ --

COLUMN 10, line 4, delete "which contains"
         line 40, delete "an adhesive composition"

Signed and Sealed this

Twenty-first Day of March, 1995

Attest:

BRUCE LEHMAN

*Attesting Officer*           *Commissioner of Patents and Trademarks*